Dec. 22, 1959 M. T. WORKS ET AL 2,918,336
PISTON
Filed March 20, 1957
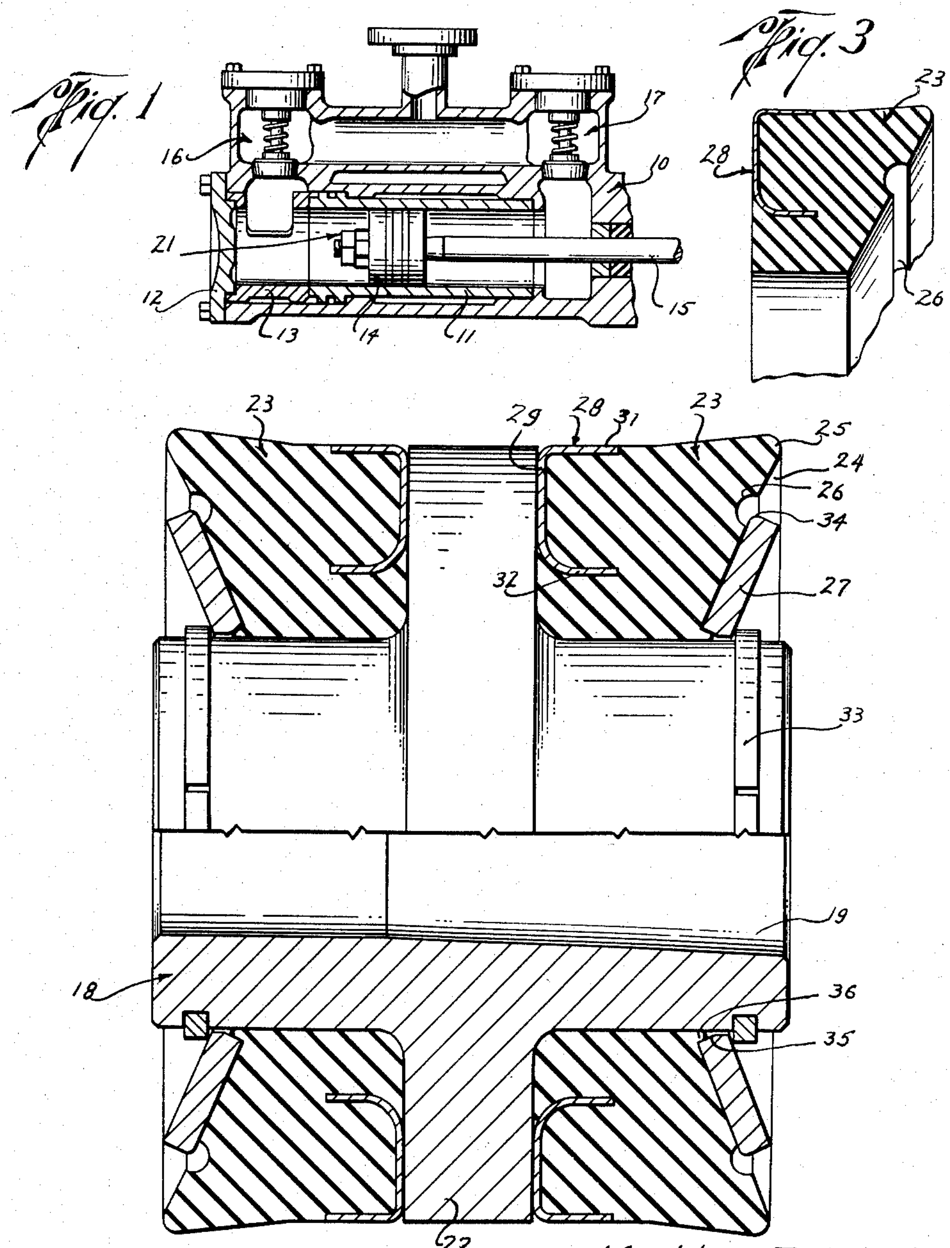
Madden T. Works
John P. Slough
INVENTORS
BY
Browning Simms & Hyer
ATTORNEYS United States Patent Office 2,918,336

Patented Dec. 22, 1959

2,918,336

PISTON

Madden T. Works, Houston, and John P. Slough, Ector County, Tex., assignors to Pioneers Specialties, Inc., Houston, Tex., a corporation of Texas Application March 20, 1957, Serial No. 647,319

7 Claims. (Cl. 309—4)

This invention relates to pistons and more particularly to pistons of the type used in slush pumps.

Slush pumps operate under the most severe conditions. Drilling mud circulated by these pumps is highly abrasive. Very high pressures are developed in maintaining circulation. These operating conditions dictate the use of resilient packing rings to seal between the piston and cylinder wall. The use of the resilient packing gives rise to many problems.

In the type of piston having an annular packing held between a flange and retainer ring on the piston body, the retainer ring does not extend to the outer periphery of the packing ring. On the suction stroke, the packing may flow over the outer rim of the retainer ring resulting in stresses in the packing at the rim of the retainer ring. Severe damage frequently occurs.

This invention provides a piston in which damage due to contact between the outer periphery of the retainer ring and the packing is eliminated.

The packing ring must be supported adjacent the backup flange to prevent it extruding between the backup flange and cylinder wall during the pressure stroke. During the suction stroke, there is a tendency for the packing ring to be sucked off the piston over the retainer ring.

This invention provides a unitary reinforcing means which prevents extrusion of the packing at the backup flange and combats the tendency of the packing to be pulled off the piston.

The seal between the packing and piston body is primarily between the packing and backup flange. It is desirable to provide a secondary seal between the packing ring and body. Such a seal may be provided by molding a lip on the packing, but the cost of the molds and the chances of damage to the packing will be increased.

This invention provides such a secondary seal by compressing the packing during assembly of the piston to form a lip in contact with the piston body.

Slush pump piston packing is dimensioned to provide an interference and pressure actuated type seal between the cylinder and packing at the juncture of the outer periphery and pressure face of the packing. This juncture is usually sharp to provide a flexible lip. Such a lip is easily damaged, particularly when first inserting a new piston packing in a cylinder. The cylinder is usually provided by a liner beveled at its mouth but these liners are bored out as they become worn and frequently the bevel is completely removed. When this occurs, cutting of a thin lip on the packing is likely when the piston is installed in the liner.

By this invention there is provided an interference and pressure actuated type seal which is not easily damaged While the rim of the packing at its pressure face is thicker, the groove in the pressure face for avoiding stress raisers at the retainer ring permits constriction of the rim even in very stiff packing.

It is an object of this invention to provide a slush pump piston in which stress raisers are largely eliminated or reduced so as to increase the average life of the piston packing.

Another object is to provide a piston in which the tendency of the packing to flow over the retainer ring on the suction stroke will not cause cracks in the packing.

Another object is to provide a piston in which the initial seal between the packing and liner is provided by a section of the packing difficult to damage.

Another object is to provide a piston in which the packing is protected against extrusion over the backup flange and against being stripped over the retainer flange.

Another object is to provide a piston in which a lip type seal is provided between the packing and piston body by compressing the packing when the piston is assembled.

Other objects, features and advantages of this invention will be apparent from the drawings, the specification and claims.

In the drawing wherein there is shown by way of illustration one embodiment of this invention and wherein like reference numerals indicate like parts:

Fig. 1 is a cross-sectional view through a fragment of the fluid end of a slush pump equipped with a piston constructed in accordance with this invention;

Fig. 2 is a view on an enlarged scale partly in elevation and partly in longitudinal cross section of the piston of this invention; and Fig. 3 is a fragmentary view on a reduced scale of the packing rings, illustrated in Fig. 2, prior to installation on the piston body.

The fluid end of the pump illustrated in Fig. 1 may take any desired form. The fluid end of the pump is provided by a body indicated generally at 10 having a pump liner 11 held therein by a cap 12 bearing against a spacer 13 between the liner and cap. The piston indicated generally at 14 is reciprocated by a rod 15 which extends to the power end of the pump, not shown. The pump illustrated is of the double-acting type and fluid is fed into the cylinder from suction valves, not shown, and exhausted from the cylinder through the valves indicated generally at 16 and 17.

Referring to Fig. 2, the piston has a body 18 with a central bore 19 therethrough. The bore 19 receives the rod 15 and the piston is held in place by the nuts indicated generally at 21 in Fig. 1.

The piston body 18 has at an intermediate point an outwardly extending annular backup flange 22. This flange has a diameter slightly smaller than the bore of the liner 11 to permit its free reciprocation therein. However, the clearance between the flange and liner should be at a minimum to provide maximum backup area for the piston packings indicated generally at 23. The two ends of the double-acting piston are identical and, therefore, the following description is applicable to both ends of the piston.

The packing 23 may be molded in the usual manner from resilient material usually employed in slush pump pistons such as rubber, synthetic rubber, etc. The packing 23 fits snugly about the piston body and abuts the backup flange 22. The outer periphery of the packing adjacent the backup flange is formed on approximately the same diameter as the backup flange 22. From an intermediate point on the outer periphery of the packing between the backup flange and the pressure face 24 of the packing, the packing flares outwardly to provide an interference engagement with the bore of the liner. This interference engagement insures an initial seal between the packing and liner as the compression stroke begins. Thereafter the fluid pressure will force the packing radially outward against the wall of the liner, This interference type seal is provided by the portion of the packing 25 which forms a juncture between the pressure face 24 and the outer periphery of the packing. It is desired to form the portion 25 of the packing in such manner that it will function to provide an interference and pressure actuated type seal and yet will not be fragile and easily damaged as in the case of a sharp lip type seal. Accordingly, the portion 25 of the packing is curved to form a surface comparable to a section of an O-ring which will function as an interference and pressure actuated type seal. It will be noted that the pressure face 24 of the packing is inclined from the curved portion 25 of the packing only a slight degree and, therefore, the lip provided by the portion 25 of the packing has a substantial thickness dimension and will not be easily damaged.

This relatively large thickness makes it difficult to compress the lip of the packing at its pressure face and where very stiff packing material is used, some provision should be made to permit constriction of the packing at this point. This may be provided by a groove 26 in the pressure face of the packing and just inwardly of the outer rim of the pressure face to permit this portion of the packing to be constricted. As will appear below, this groove may be positioned to prevent damage to the packing due to its tendency to flow over the retainer ring 27 on the suction stroke.

During the compression stroke, the packing is urged toward the backup flange 22 with considerable pressure. This pressure tends to force the packing ring 23 to extrude through the clearance between the backup flange 22 and the liner 11. To overcome this tendency, the end of the packing which abuts the backup flange 22 may be reinforced. During the suction stroke, there is a tendency for the packing to be sucked off of the piston body over the retainer ring 27. It is desirable to provide some means which will resist the tendency of the packing to flow over the retainer ring 27. These two objectives may be accomplished by a unitary reinforcing means which contains the packing at its outer periphery adjacent the backup flange 22 and which extends into the packing and in a direction away from the backup flange to resist the tendency of the radially innermost section of the packing ring to flow radially outwardly so that it may pass over the retainer ring 27. Such a reinforcing means may be provided by an annular member 28 which is molded in the packing 23. The annular member 28 is preferably channel shaped in cross section with the web 29 of the channel shaped member at one end of the packing 23 so as to be in abutment with the backup flange 22. One leg 31 of the channel shaped member 28 preferably extends away from the backup member 22 and is positioned at the outer periphery of the packing 23 to cooperate with the web 29 and prevent extrusion of the packing during the compression stroke. The other leg 32 of the channel shaped member extends into the packing a sufficient distance to contain a substantial amount of the radially innermost section of the packing against flowing outward over the retainer ring 27. The width of the web portion 29 of the reinforcing member should be such as to leave a substantial area of packing in the annulus between the piston body 18 and the leg 32 for engagement with the backup flange 22 to form a seal therewith. This seal will prevent washing of fluid by the packing 23 during the compression stroke.

The packing 23 is held on the piston by the retainer ring 27 which in turn is held in place by a snap ring 33 in a groove in the piston body. During the suction stroke, the packing tends to flow over the outer periphery or rim 34 of the retainer ring 27 and the resulting stresses in the packing at this point will frequently cause cuts or cracks. The stress raisers caused by such cracks, of course, will propagate through the packing and its life will be materially shortened.

Provision is made for avoiding the tendency of the rim of the retainer ring 27 to cause stress raisers in the packing 23 by providing the groove 26 in the pressure face of the packing and underlying the rim of the retainer 27. Preferably, the groove 26 is a smooth wall, round bottom, substantially semicircular indentation in the pressure face of the packing. With this arrangement the tendency of the packing to flow away from the backup flange will not cause stress raisers as the packing may flow a considerable distance away from the backup flange 22 before the rim 34 of the retainer ring 27 comes in contact with the bottom of the groove. Preferably, the groove is dimensioned so that in normal service the rim 34 of the retainer ring will not come into contact with the bottom of the groove. However, even if it does, the stresses will not be as great as in packing which is not provided with such a groove. While a semicircular groove is preferred, it will be appreciated that any shape of groove may be provided, it being preferred, however, to avoid any sharp corners which would provide stress raisers in the packing.

As noted above, the primary seal between packing 23 and the piston is provided at the backup flange. However, it is preferred to provide a secondary seal between the packing and body. It is desirable to form such a seal without the necessity of special contours or the like on the packing as this increases the cost of molds for fabricating the packing and where a lip is formed on the packing, this lip is susceptible of damage. In the instant invention the contour of the packing adjacent the retainer ring 27 and at the bore through the packing is formed on straight lines with the bore and pressure face of the packing forming an included angle of slightly more than 90 degrees. The relative dimensions between the backup flange 22 and retainer ring 27, and the axial dimension of the packing 23 is such that the packing is held under compression between the backup flange 22 and the retainer ring 27. When under compression, the packing will, of course, flow. Advantage is taken of this characteristic of the packing to provide in the juncture between the body and retainer ring a groove into which the packing may flow so that there will automatically be provided a lip type seal around the piston body upon assembly of the piston. This groove is preferably provided by beveling the retainer ring at 35 to provide a V-shaped groove between the body and the bevel 35 which will receive the lip 36 of the packing material formed by the packing flowing into the groove formed by the bevel 35. The lip so formed will prevent washing of fluid between the packing and piston body. It will be understood that this groove might take any shape which will result in lip 36, the bevel 35 being preferred.

From the foregoing it will be seen that this invention is one well adapted to attain all of the ends and objects herein above set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. A pump piston comprising, a body adapted to be secured to a rod of a pump, an annular backup flange extending outwardly from the body, an annular packing ring positioned on the body in abutment with the backup flange with its end opposite said flange providing a pressure face, an annular retainer ring, means securing the retainer ring on the body with the packing ring held between the backup flange and retainer ring, and said packing ring having an annular groove in the pressure face thereof underlying and with its bottom spaced from the outer edge of the retainer ring.

2. A pump piston comprising, a body adapted to be secured to a rod of a pump, an annular backup flange extending outwardly from the body, an annular packing ring positioned on the body in abutment with the backup flange with its end opposite said flange providing a pressure face, an annular retainer ring, means securing the retainer ring on the body with the packing ring held between the backup flange and retainer ring, and said packing ring having an annular groove arcuate in cross section in the pressure face thereof underlying and with its bottom spaced from the outer edge of the retainer ring.

3. A pump piston comprising, a body adapted to be secured to a rod of a pump, an annular backup flange extending outwardly from the body, an annular packing ring positioned on the body in abutment with the backup flange with its end opposite said flange providing a pressure face, the outer periphery of the packing ring flaring outwardly at the end of the ring remote from the flange, the juncture between the flared outer periphery of the ring and the pressure face constituting an arcuate section, an annular retainer ring, means securing the retainer ring on the body with the packing ring held between the backup flange and retainer ring, and said packing ring having an annular groove in the pressure face thereof underlying and with its bottom spaced from the outer edge of the retainer ring.

4. A pump piston comprising, a body adapted to be secured to a rod of a pump, an annular backup flange extending outwardly from the body, an annular packing ring positioned on the body in abutment with the backup flange, an annular retainer ring, and means securing the retainer ring on the body with the packing ring compressed between the backup flange and retainer ring, said retainer ring and body being shaped to provide a groove between them at the bore through the retainer ring on the side thereof engaging the packing to permit the packing ring to flow into the groove and form a lip sealing between the packing and body.

5. A pump piston comprising, a body adapted to be secured to a rod of a pump, an annular backup flange extending outwardly from the body, an annular packing ring positioned on the body in abutment with the backup flange, an annular retainer ring, and means securing the retainer ring on the body with the packing ring compressed between the backup flange and retainer ring, said retainer ring beveled at the bore through the retainer ring on the side engaging the packing to permit the packing ring to flow into the bevel and form a lip sealing between the packing and body.

6. A pump piston comprising, a body adapted to be secured to a rod of a pump, an annular backup flange extending outwardly from the body, an annular packing ring positioned on the body in abutment with the backup flange with its end opposite said flange providing a pressure face, the outer periphery of the packing ring flaring outwardly at the end of the ring remote from the flange, the juncture between the flared outer periphery of the ring and the pressure face constituting an arcuate section, reinforcing means at one end of the ring, an annular retainer ring, means securing the retainer ring on the body with the packing ring compressed between the backup flange and retainer ring, said retainer ring and body being shaped to provide a groove between them at the bore through the retainer ring on the side thereof engaging the packing to permit the packing ring to flow into the groove and form a lip sealing between the packing and body, and said packing ring having an annular groove in the pressure face thereof underlying and with its bottom spaced from the outer edge of the retainer ring.

7. A pump piston comprising, a body adapted to be secured to a rod of a pump, an annular backup flange extending outwardly from the body, an annular packing ring positioned on the body in abutment with the backup flange, an annular retainer ring, means securing the retainer ring on the body with the packing ring compressed between the backup flange and retainer ring, said retainer ring and body being shaped to provide a groove between them at the bore through the retainer ring on the side thereof engaging the packing to permit the packing ring to flow into the groove and form a lip sealing between the packing and body, and said packing ring having an annular groove in the end wall thereof underlying and with its bottom spaced from the outer edge of the retainer ring.

References Cited in the file of this patent

UNITED STATES PATENTS

| | | |
|---|---|---|
| Re. 22,054 | Sharp et al. | Mar. 24, 1942 |
| 2,051,262 | MacClatchie | July 18, 1936 |
| 2,144,736 | MacClatchie | Jan. 24, 1939 |
| 2,306,800 | Caldwell | Dec. 29, 1942 |
| 2,306,838 | Volpin | Dec. 29, 1942 |
| 2,676,075 | Stone | Apr. 20, 1954 |
| 2,808,301 | Bowerman | Oct. 1, 1957 |